United States Patent
Balasaygun et al.

(10) Patent No.: US 8,380,805 B2
(45) Date of Patent: Feb. 19, 2013

(54) PEER-TO-PEER MIXING SYSTEM AND METHOD

(75) Inventors: Mehmet C. Balasaygun, Freehold, NJ (US); Timothy I. Ross, Fair Haven, NJ (US); Douglas M. Grover, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 697 days.

(21) Appl. No.: 12/645,933

(22) Filed: Dec. 23, 2009

(65) Prior Publication Data

US 2011/0047238 A1  Feb. 24, 2011

Related U.S. Application Data

(60) Provisional application No. 61/235,838, filed on Aug. 21, 2009.

(51) Int. Cl.
*G06F 15/16* (2006.01)
*G06F 12/00* (2006.01)

(52) U.S. Cl. ....................... 709/208; 709/203

(58) Field of Classification Search .................. 709/203, 709/208–211, 250
See application file for complete search history.

(56) References Cited

U.S. PATENT DOCUMENTS

| | | | |
|---|---|---|---|
| 2007/0211703 A1* | 9/2007 | Gu et al. | 370/356 |
| 2008/0177833 A1 | 7/2008 | Gu et al. | |
| 2009/0135740 A1* | 5/2009 | Dhara et al. | 370/260 |
| 2009/0328209 A1* | 12/2009 | Nachenberg | 726/22 |
| 2010/0238925 A1* | 9/2010 | Karuppiah | 370/390 |
| 2011/0071953 A1* | 3/2011 | Shen et al. | 705/319 |
| 2012/0158876 A1* | 6/2012 | She | 709/206 |

* cited by examiner

*Primary Examiner* — Zarni Maung

(57) ABSTRACT

The system gets a request to add a communication node to an existing peer-to-peer communication session between two communication nodes. The communication node is added to the existing peer-to-peer communication session. The communication nodes in the existing peer-to-peer communication have not previously defined a mixing node. The communication nodes in the existing peer-to-peer communication session exchange a mixing score. A mixing node is determined based on the exchanged mixing score. Additional systems are defined which determine a mixing node when two peer-to-peer communication sessions are joined into a combined peer-to-peer communication session.

24 Claims, 6 Drawing Sheets

| | |
|---|---|
| NUMBER OF STREAMS THAT CAN BE MIXED | 4 (40) |
| IS MIXING ALLOWED? | YES |
| CAN THE COMMUNICATION NODE BE MOBILE? | YES |
| IF THE COMMUNICATION NODE CAN BE MOBILE, IS IT DOCKED? | NO (-30) |
| CURRENT PROCESSING CAPABILITY OF THE COMMUNICATION NODE | 20 |
| RAW PROCESSING CAPABILITY OF THE COMMUNICATION NODE | 50 |
| LOCATION OF THE COMMUNICATION NODE RELATIVE TO OTHER COMMUNICATION NODES | +10 |
| QUALITY OF SERVICE (QoS) OF THE NETWORK | -10 |
| MIXING SCORE | 80 |

FIGURE 1

PEER-TO-PEER MIXING SYSTEM AND METHOD

RELATED U.S. PATENT APPLICATION DATA

This application claims the benefit under 35 U.S.C. §119(e) of U.S. Provisional Application No. 61/235,838, filed Aug. 21, 2009, entitled "MOJO."

TECHNICAL FIELD

The system and method relate to communication mixing systems and in particular to peer-to-peer communication mixing systems.

BACKGROUND

Currently, there are various systems that can mix communication streams such as video and audio streams in a peer-to-peer environment. In existing peer-to-peer systems, users can set up three- or multi-party conference calls from their communication device. The communication node that the originator used to setup the conference is defined as the mixing node. These types of systems have problems when the originator of the conference wants to drop out of the conference while the other participants want to stay on the conference. When the originator of the conference exits, the conference is dropped. The other participants must make a new communication in order to continue.

Other systems, such as the system described in U.S. Patent Publication No. 2008/0177833, disclose a peer-to-peer system that creates an initial overlay mesh network that identifies an initial mixing node. Later, hierarchical networks of mixers are created to stream the conference in a more efficient manner. The problem with this system is that nodes in the network constantly have to send messages to each other even if a conference is not established. Moreover, a large mixing hierarchy may introduce latency. This creates unnecessary overhead and delay in the network.

SUMMARY

The system and method are directed to solving these and other problems and disadvantages of the prior art. The system gets a request to add a communication node to an existing peer-to-peer communication session between two communication nodes. The communication node is added to the existing peer-to-peer communication session. The communication nodes in the existing peer-to-peer communication have not previously defined a mixing node. The communication nodes in the existing peer-to-peer communication session exchange a mixing score. A mixing node is determined based on the exchanged mixing score. Additional systems are defined which determine a mixing node when two peer-to-peer communication session are joined into a combined peer-to-peer communication session.

BRIEF DESCRIPTION OF THE DRAWINGS

These and other features and advantages of the system and method will become more apparent from considering the following description of an illustrative embodiment of the system and method together with the drawing, in which:

FIG. 1 is an illustrative diagram of a table that is used to derive a mixing score that is exchanged between communication nodes in a peer-to-peer communication session.

DETAILED DESCRIPTION

Figure 2:
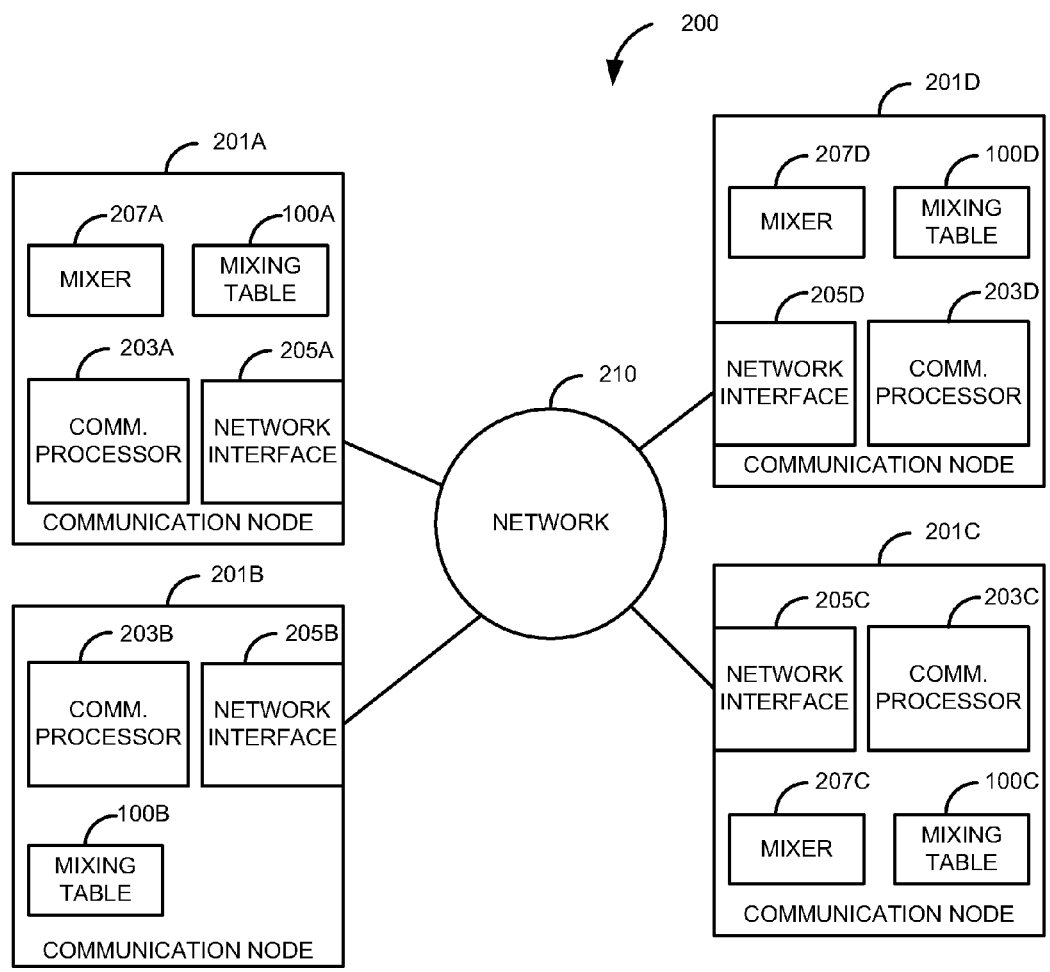
FIG. 2 is a block diagram of a first illustrative system for mixing a peer-to-peer communication session.

FIG. 1 is an illustrative diagram of a mixing table 100 that is used to derive a mixing score 106 that is exchanged between communication nodes in a peer-to-peer communication session to determine a mixing node. A mixing node is a communication node that is used to mix a peer-to-peer communication session between three or more communication nodes.

The mixing table 100 can be stored in a variety of systems such as a database, a directory service, a file, a spreadsheet, a file system, and the like. The mixing table 100 contains one or more items 102 that have a value 104. The values 104 are used to compute a mixing score 106. While the table 100 is providing default values for illustrative purposes, the values 104 are configurable at any time on the communication devices. However, for the purposes of consistency, it is desirable for all communication devices participating in a communication session to have the same value considerations for the devices to come up with consistent scoring for the session. The mixing table 100 as shown can be used to calculate a mixing score 106 using a variety of methods. This example shows the scores being added. Other methods for calculating the mixing score 106 could include, but are not limited to, multiplying the values 104, sending a single value 104 for the mixing score 106 (e.g., the raw processing capability of the communication node), or various combinations, and the like. Some of the values 104 have a number that can be added to produce the mixing score 106. For example, the item 102 "number of streams that can be mixed" has a value of 40 (10 for each stream that can be mixed) that is used in the calculation of the mixing score 106. Likewise, the item 102 "if the communication node can be mobile" has a value of −30 that is used in the calculation of the mixing score 106. The −30 value indicates that the communication node is mobile and is not as good a choice to be a mixing node because of the higher possibility of dropping a peer-to-peer communication session.

Other items 102 such as "is mixing allowed" do not have an associated number for its value 104. In this example, "is mixing allowed" is set to "YES". If "is mixing allowed" were set to "NO", this would override the values 104 of the other items 102; instead of adding the number of the values 104, a number of 0 would be used for the mixing score 106 to indicate that this communication node cannot be used as a mixing node. The items 102 in the mixing table 100 as shown are typically static items. However, some of the items 102 may change based on various conditions. For example, the location of the communication node relative to other communication nodes may change when other communication nodes are added or removed from a communication session. Likewise, the Quality of Service of the network may change based on network congestion or other factors.

The mixing score can be determined from a variety of factors such as a number of streams that can be mixed by the individual communication node, if mixing is allowed by the individual communication node, whether the individual communication node can be mobile, if the individual communication node can be mobile, whether it can be docked, a current processing capability of the individual communication node, a raw processing capability of the individual communication node, ability of the individual communication node to channel all of its resources to the communication session, if such channeling is needed (i.e., is the communication node a device shared for various applications such as a PC where the amount of resources utilized by the communication session cannot be precisely controlled), whether the communication device is a device dedicated to communication, a location of the individual communication node, network proximity of an individual communication node to other communication nodes in the conference call, and the Quality of Service (QoS) of a network used by the individual communication node.

FIG. 2 is a block diagram of a first illustrative system 200 for mixing a peer-to-peer communication session. The first illustrative system 200 can comprise three or more communication nodes 201 but is shown illustratively in FIG. 2 with four communication nodes 201A-201D. Communication nodes 201A-201D communicate via network 210. The network 210 can be any type of network such as the Internet, a packet network, Local Area Network (LAN), a Wide Area Network (WAN), a circuit switched network, an enterprise network, and the like.

The communication node 201 comprises the mixing table 100 with the mixing score 106, a communication processor 203, and a network interface 205. The communication node 201 can also comprise a mixer 207. At least one communication node 201 will comprise a mixer 207. This is illustrated in FIG. 2 that shows communication nodes 201A, 201C, and 201D with the mixer 207 and communication node 201B without the mixer 207.

A communication node 201 may be any communication device capable of sending and receiving data such as a digital telephone, an analog telephone, a video phone, a Personal Digital Assistant (PDA), a cellular telephone, a Personal Computer (PC), and the like. The communication processor 203 can be any device capable of processing information such as a microprocessor, a personal computer (PC), and the like. The communication processor 203 can process packet information, analog information, time division multiplexed information, and the like. The network interface 205 can be any device capable of sending and receiving data such as a network card, a packet card, a line card, and the like. The network interface 205 can be comprised of an analog and/or a digital interface (e.g., an Internet Protocol Interface). The mixer 207 can be any device capable of mixing communication streams for a peer-to-peer communication session. The communication streams can be audio streams, video streams, data streams, and/or the like.

A peer-to-peer communication session is set up between two communication nodes 201. For example, a peer-to-peer communication session is set up between communication node 201A and communication node 201D. The peer-to-peer communication session has not defined a mixing node that is designated for mixing of communication streams of the peer-to-peer communication session. The network interface 205A gets a request to add one or more communication nodes (201B in this example) to the existing peer-to-peer communication session between communication node 201A and 201D. The request can be sent from communication node 201B, based on input from a user at communication node 201A or 201D, and the like. The communication processor 203A adds communication node 201B to the existing peer-to-peer communication session between communication nodes 201A and 201D.

Communication nodes 201A, 201B, and 201D in the peer-to-peer communication session exchange the mixing score 106. The exchange of mixing scores can be done at the same time (between communication nodes 201A, 201B, and 201D), or communication nodes 201A and 201D could exchange their mixing score when the communication session is initially created; then communication node 201B could exchange mixing scores with communication nodes 201A and 201D after the request to add communication node 201B. The mixing score 106 is anything that contains information to compare mixers 207; this is used to determine which mixer 207 is better suited for mixing of the peer-to-peer communication session. A mixing score 106 can include but is not limited to the mixing table 100, portions of the mixing table 100, the mixing score 106 within the mixing table 100, and the like. For example, exchanging the mixing score 106 could be exchanging mixing tables 100 between communication nodes 201A, 201B, and 201D.

After receiving the mixing score 106 from the other communication nodes 201 in the peer-to-peer communication session, the receiving communication node 201 can determine based on the mixing score 106 of communication nodes 201A, 201B, and 201D in the peer-to-peer communication session a mixing node (the node that will mix the peer-to-peer communication session for communication nodes 201A, 201B, and 201D). For example, if the mixing score 106 of communication node 201A is 40, the mixing score 106 of communication node 201D is 80, and the mixing score 106 of communication node 201B is 0 (because communication 201B does not have a mixer 207), communication nodes 201A, 201B, and 201D can determine that communication node 201D has the highest mixing score 106 by comparing the mixing scores 106 (80 for communication node 201D compared to 40 for communication node 201A and 0 for communication node 201B) to determine the highest mixing score 106. It should be noted that a communication node logic that processes mixing scores from various participants of a conference call should also have an inertia built into its rules such that the mixing is not all too frequently moved from one participating device to the next for very small score differences.

Based on the determination that communication node 201D is the mixing node, communication nodes 201A and 201B stream their communication streams via their network interfaces 205 to communication node 201D for mixing in mixer 207D. Communication node 201D also takes the communication stream generated locally. These three streams are then used to produce a composite stream. The composite stream is then streamed to communication nodes 201A, 201B, and 201D (e.g., to the user communication node 201D while listening to the conference). The composite stream for a communication node 201 in the peer-to-peer communication session will comprise the streams from the other communication nodes 201 involved in the peer-to-peer communication session. For example, the composite stream that is sent to communication node 201A from communication node 201D will include the mixed streams from communication nodes 201B and 201D. The composite stream sent to communication node 201B from communication node 201D will include the mixed streams from communication nodes 201A and 201D. Likewise, the composite stream sent from communication node 201D to a user of communication 201D (e.g., to itself) will include the mixed communication streams from communication nodes 201A and 201B. This allows the users at communication nodes 201A, 201B, and 201D to listen/view a conference of the peer-to-peer communication session.

Figure 3:
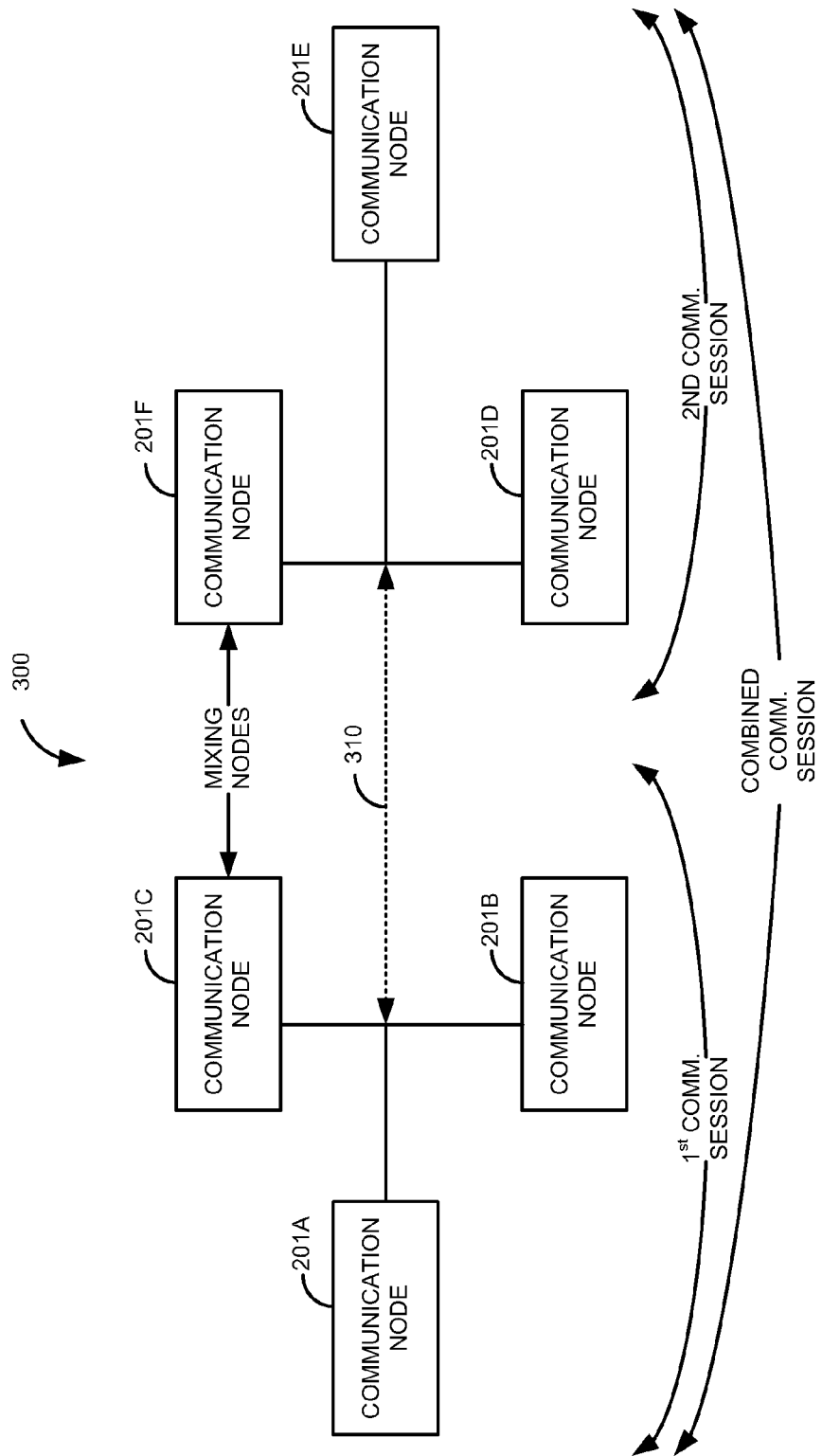
FIG. 3 is a block diagram of a second illustrative system for joining multiple mixed peer-to-peer communication sessions.

FIG. 3 is a block diagram of a second illustrative system 300 for joining multiple mixed peer-to-peer communication sessions. A first peer-to-peer communication session is set up between communication nodes 201A-201C using the previously described process. The communication nodes 201A-201C determine that communication node 201C is the mixing node for the first peer-to-peer communication session by exchanging the mixing scores 106 of communication nodes 201A-201C. A second peer-to-peer communication is set up between communication nodes 201D-201F using the previously described process. The communication nodes 201D-201F determine that communication node 201F is the mixing node for the second peer-to-peer communication session by exchanging the mixing scores 106 of communication nodes 201D-201F.

One of the communication nodes (communication node 201A) in the first peer-to-peer communication session receives a request to join the first peer-to-peer communication session and the second peer-to-peer communication session into a combined peer-to-peer communication session. Upon receipt of the request to join the first peer-to-peer communication session and the second peer-to-peer communication session into a combined peer-to peer communication session, the communication processor 203A repeats the method of the configuration described in FIG. 2. The request to join the peer-to-peer communication session is similar to adding one or more communication nodes 201 into the existing peer-to-peer communication session. The two peer-to-peer communication sessions are joined 310 into a combined peer-to-peer communication session.

The mixing nodes 201A-201F exchange mixing scores 106. Based on the exchange of the mixing scores 106, there are several results that can happen. In one embodiment, based on the communication node 201 with the highest mixing score 106, one of the mixing nodes 201C or 201F that are mixing nodes in the two peer-to-peer communication sessions becomes the mixing node for the combined peer-to-peer communication session. In a second embodiment, the two mixing nodes in the existing peer-to-peer communication sessions continue to mix. The mixing node sends a mixed communication stream to the other mixing node. In a third embodiment, a new mixing node is designated for the combined peer-to-peer communication session based on the mixing score 106.

Figure 4:
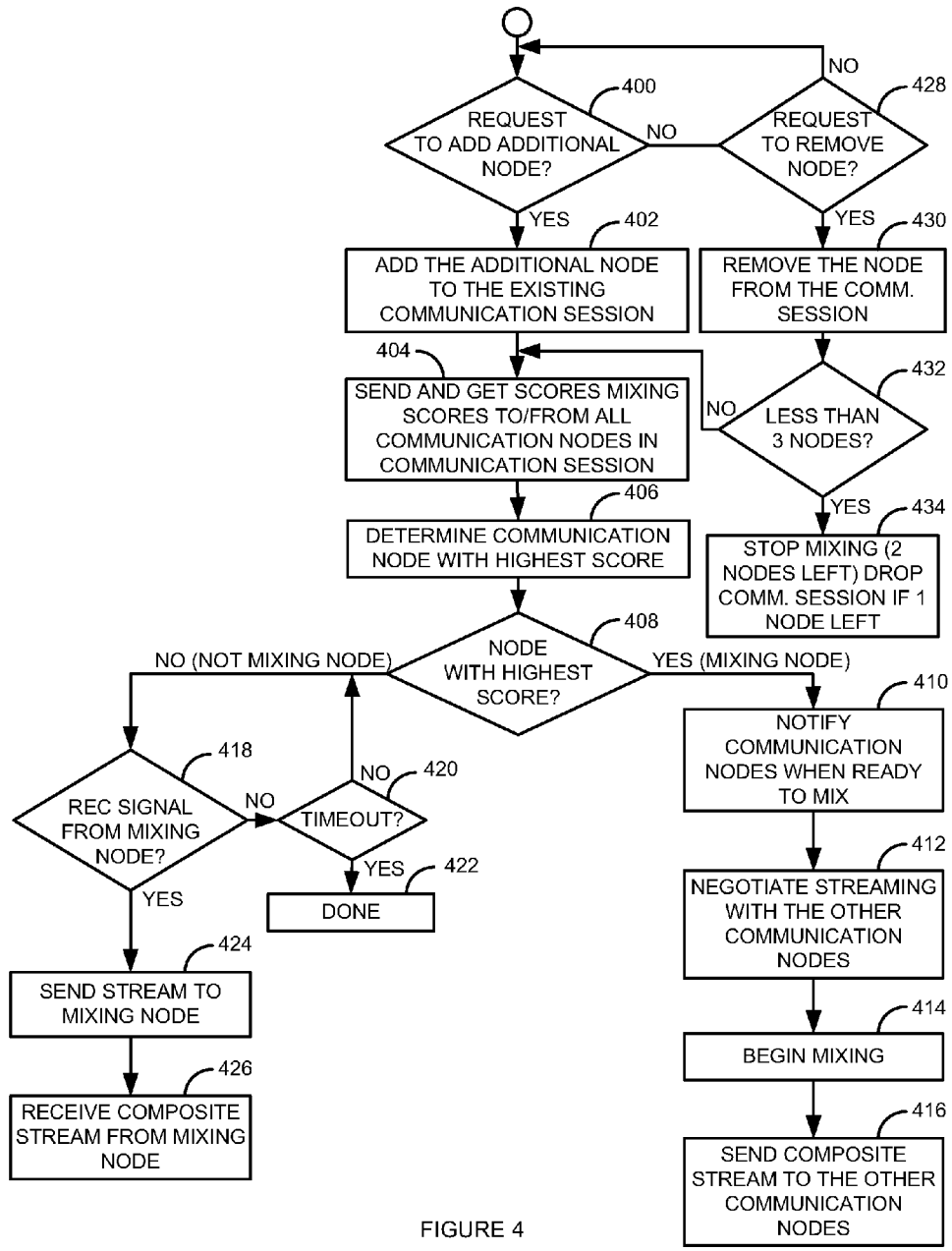
FIG. 4 is a flow diagram of a method for mixing a peer-to-peer communication session.

FIG. 4 is a flow diagram of a method for mixing a peer-to-peer communication session. Illustratively, the communication processor 203, the network interface 205, and the mixer 207 are stored-program-controlled entities, such as a computer or processor, which performs the method of FIGS. 4-7 by executing a program stored in a storage medium, such as a memory or disk.

The process begins in step 400 when a request to add an additional communication node 201 into the existing peer-to-peer communication session (between at least two communication nodes 201) is gotten by the communication processor 203. If a request to add an additional communication node 201 is gotten in step 400, the communication processor 203 adds 402 the additional communication node 201 to the existing peer-to-peer communication session. The communication processor 203 that gets the request to add the additional communication node 201 can notify the other communication nodes 201 in the existing peer-to-peer communication session of the additional communication node 201. The network interfaces 205 in the communication nodes 201 in the peer-to-peer communication session sends and gets 404 the mixing scores 106 from the other communication nodes 201 in the peer-to-peer communication session. The communication processors 203 in the peer-to-peer communication session determine the communication node 201 with the highest mixing score 106.

The communication processor 203 in the communication node 201 determines if it has the highest mixing score 106 in step 408. If a communication processor 203 determines that it has the highest mixing score 106 in step 408 and is the mixing node, the mixing node optionally (this is optional because all the communication nodes have each other's mixing score) notifies 410 the other communication nodes 201 in the peer-to-peer communication session via the network interface 205 when it is ready to mix the communication streams from the communication nodes 201 in the peer-to-peer communication session. The mixing node negotiates 412 streaming (i.e., sending and receiving the communication streams) with the other communication nodes 201 in the peer-to-peer communication session. The mixing node begins 414 to mix the communication streams via the mixer 207. The mixing node then sends 416 the composite stream via the network interface 205 to the other communication nodes 201 in the peer-to-peer communication session.

If a communication processor 203 in a communication node 201 determines in step 408 that it does not have the highest mixing score 106 (based on comparing the mixing scores 106, the communication processor 203 will know the mixing node), the communication processor 203 waits in step 418 to receive a signal (sent in steps 410 and/or 412). If a signal is not received in step 418, the communication processor 203 determines if a timeout value has been reached in step 420. If a timeout value has not been reached in step 420, the communication processor 203 goes back to step 418. Otherwise, the process is done 422.

If the communication node 201 is not the mixing node in step 408 and the communication node 201 received a control signal at the network interface 205 from the mixing node (e.g., notification from step 410 and/or negotiation from step 412) in step 418, the communication node 201 sends 424 its communication stream via the network interface 205 to the mixing node. The communication node 201 then receives 426 the composite stream from the mixing node via the network interface 205.

If the communication node 201 in step 400 has not received a request to add an additional communication node 201 to the peer-to-peer communication session, the communication processor 203 determines in step 428 if a request to remove a communication node 201 from the peer-to-peer communication session has been received. If a request to remove a communication node 201 from the peer-to-peer communication session has not been received the process goes to step 400.

Otherwise, if a request to remove a communication node 201 from the peer-to-peer communication session has been received in step 428, the communication processor 203 removes 430 the communication node 201 from the peer-to-peer communication session. The communication processor 203 can communicate the request to remove the communication node 201 to the other communication nodes 201 in the peer-to-peer communication session. The communication processor 203 determines in step 432 if there are now less than three communication nodes 201 in the peer-to-peer communication session. If there are three or more communication nodes 201 in the peer-to-peer communication session in step 432, the process goes to step 404. Otherwise, if there are less than three communication nodes 201 in the peer-to-peer communication session in step 432, the mixing node's mixer 207 stops mixing (if there are two communication nodes 201 in the peer-to-peer communication session). If there is only one communication node 201 left in the peer-to-peer communication session, the peer-to-peer communication session is dropped by the communication processor 203.

Figure 5:
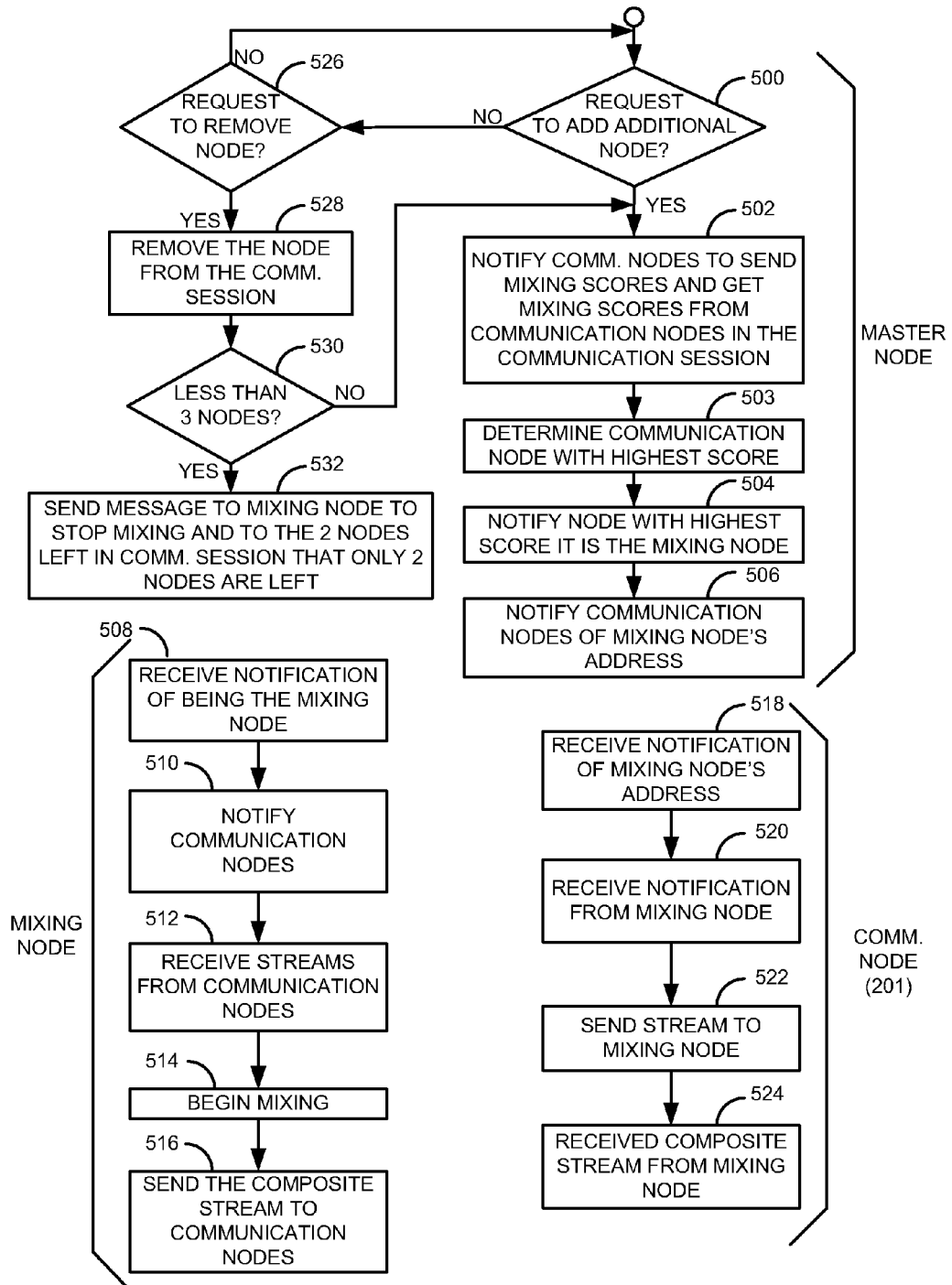
FIG. 5 is a flow diagram of a method for mixing a peer-to-peer communication session using a master/slave configuration.

FIG. 5 is a flow diagram of a method for mixing a peer-to-peer communication session using a master/slave configuration. In a master/slave configuration, one of the communication nodes 201 is designated as a master node. The master node can be designated using various methods similar to the designation of the mixing node such as an arbitration process (i.e., exchanging a score similar to the mixing score 106 (or the mixing score) to determine which communication node will be the master node), the first communication node 201 to initiate the peer-to-peer communication session, a comparison of current processing capabilities of the communication nodes 201 in the peer-to-peer communication session, designating the mixing node as the master node, a raw processing capability of the communication nodes 201 in the peer-to-peer communication session, and the like. In the examples described below, the master node and the mixing node can be determined to be in different communication nodes 201 in the peer-to-peer communication session; the master node can be the same communication node 201 as the mixing node.

After a master node is designated, the master node's communication processor 203 determines in step 500 if there is a request to add an additional communication node 201 to an existing peer-to-peer communication session. The request to add an additional communication node 201 can come from the master node (e.g., a user at the master node is trying to add a communication node 201 to the peer-to-peer communication session), or can be sent/forwarded by the other communication nodes 201 in the peer-to-peer communication session to the master node. If there is a request to add an additional communication node 201 to the existing peer-to-peer communication session in step 500, the master node's communication processor 203 notifies 502 the communication nodes 201 via the network interface 205 to send their mixing scores 106 to the master node; the master node gets 502 the mixing scores 106 via the network interface 205 from the communication nodes 201 involved in the peer-to-peer communication session. The master node (communication processor 203) determines 503 the communication node 201 (including the master node) with the highest mixing score 106. The master node's communication processor 203 notifies 504 the communication node 201 with the highest mixing score 106 that it is the mixing node (via the network interface 205 unless the master node is the determined mixing node). The master node's communication processor 203 notifies 506 via the network interface 205 the other communication nodes 201 of the address of the mixing node.

If in step 500, the master node has not received a request to add an additional communication node 201, the master node's communication processor 203 determines in step 526 if a request was received to remove one of the communication nodes 201 in the peer-to-peer communication session. If a request to remove one of the communication nodes 201 was not received in step 526, the process goes to step 500.

Otherwise, if a request to remove one of the communication nodes 201 was received in step 526, the master node's communication processor 203 removes 528 the node from the peer-to-peer communication session. The request to remove one of the communication nodes 201 can come from the master node (e.g., a user at the master node is trying to remove a communication node 201 from the peer-to-peer communication session), or can be sent/forwarded by the other communication nodes 201 in the peer-to-peer communication session to the master node. The master node's communication processor 203 determines in step 530 if there are less than three communication nodes 201 in the peer-to-peer communication session. If there are three or more communication nodes 201 in the peer-to-peer communication session in step 530, the process goes to step 502. Otherwise, if there are less than three communication nodes 201 in the peer-to-peer communication session in step 530, the master node sends 532 a message via the network interface 205 to the mixing node to stop mixing. The master node also sends in step 532 a message via the network interface 205 to the two communication nodes 201 left in the peer-to-peer communication session that there are only two communication nodes 201 left in the peer-to-peer communication session and there is no longer a mixing node. The two communication nodes 201 left in the peer-to-peer communication will stream to each other.

The mixing node receives 508 the notification of being the mixing node which was sent by the master node in step 504. The mixer 207 in the mixing node notifies 510 via the network interface 205 the other communication nodes 201 in the peer-to-peer communication session to send their streams to the mixing node. The mixer 207 in the mixing node receives 512 communication streams from the other communication nodes 201 in the peer-to-peer communication session (sent in step 522). The mixer 207 in the mixing node begins mixing 514 the communication streams from the other communication nodes 201 in the peer-to-peer communication session. The mixing node then sends via the network interface 205 the composite stream to the other communication nodes 201 in the peer-to-peer communication session.

The other communication nodes 201 (that are not the mixing node) in the peer-to-peer communication session receive 518 the notification of the mixing nodes address sent in step 506 by the master node. The communication node 201 receives 520 the notification from the mixing node sent in step 510. Steps 520 and 510 can be initiated by either the mixing node or the communication node 201. The communication node 201 sends 522 its communication stream to the mixing node (received by the mixing node in step 512). The communication node 201 receives 524 the composite stream from the mixing node sent in step 516.

Figure 6:
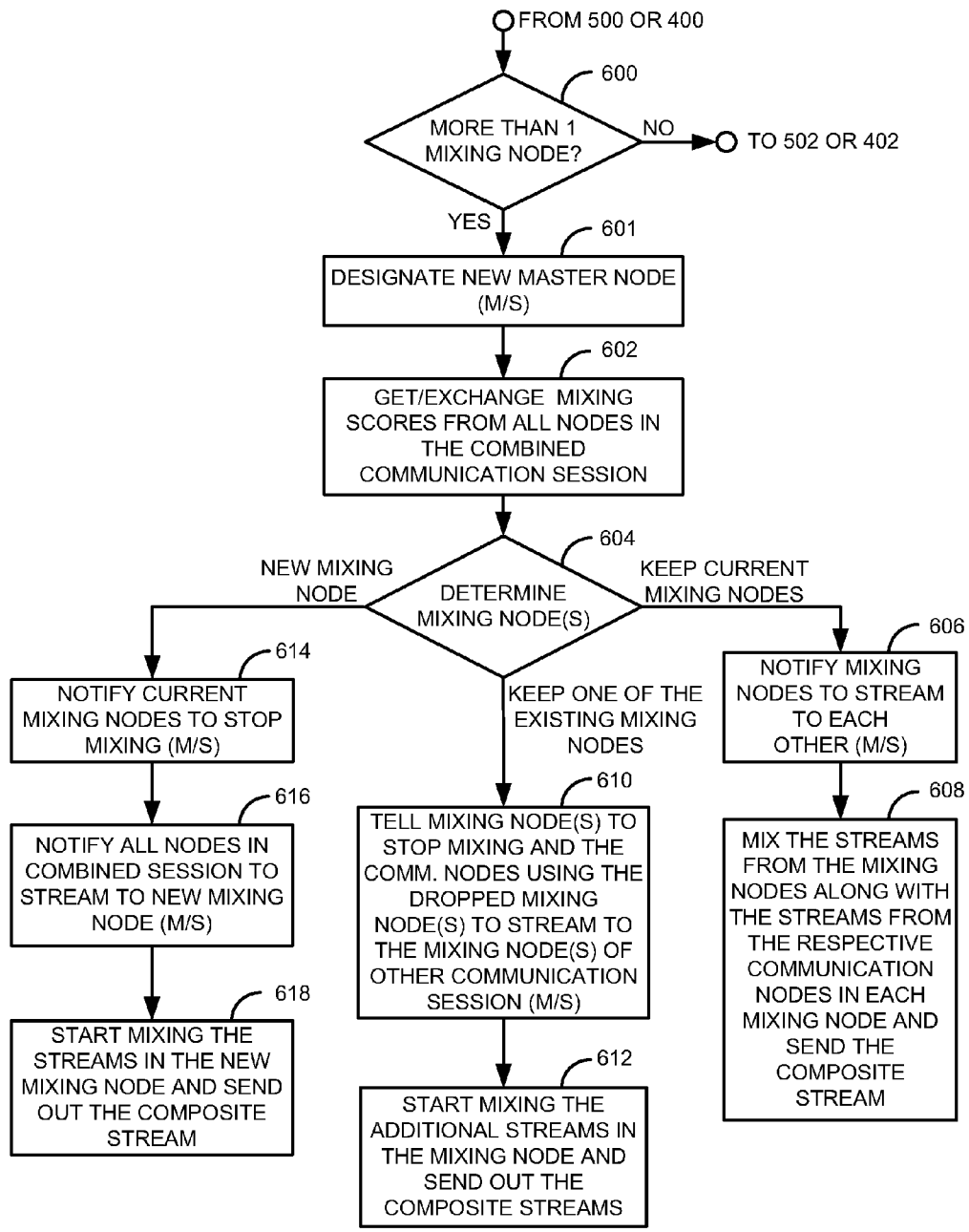
FIG. 6 is a flow diagram of a method for determining mixing node(s) when two mixed peer-to-peer communication sessions are combined.

FIG. 6 is a flow diagram of a method for determining mixing node(s) when two mixed peer-to-peer communication sessions are combined. The process begins from either step 400 (FIG. 4) or step 500 (FIG. 5). When the communication processor 203 receives (400 or 500) a request to add an additional communication node 201 (i.e., join the communication nodes 201 of a second peer-to-peer communication session), the communication processor 203 determines in step 600 if there is more than one mixing node in the combined peer-to-peer communication session. If there is only one mixing node in the combined peer-to-peer communication session, the process goes to step 402 or 502.

Otherwise, if there is more than one mixing node in step 600, a new master node is designated 601 for the combined peer-to-peer communication session in a master/slave system. In a master/slave (M/S) system, a new master node is arbitrated in a similar manner as described previously. The master node gets 602 the mixing scores 106, or in a peer-to-peer system, the communication nodes 201 exchange 602 the mixing scores 106 from the communication nodes 201 in the combined peer-to-peer communication session (the communication from the two peer-to-peer communication sessions). The master node determines in step 604 which communication node(s) 201 will be mixing node(s) or in a peer-to-peer system, the communication nodes determine which communication node(s) will be the mixing node.

In one embodiment, a new mixing node is determined in step 604. A new mixing node is determined based on the mixing score 106 of the communication nodes 201 in the combined peer-to-peer communication session. The master node notifies 614 the current mixing nodes to stop mixing. The master node in a master/slave system notifies 616 the communication nodes 201 in the combined peer-to-peer communication session to stream to the new mixing node. In a peer-to-peer system, the communication nodes 201 in the combined peer-to-peer communication session will know which communication node 201 is the mixing node because the communication nodes 201 have the mixing scores 106 of the communication nodes 201 in the combined peer-to-peer communication session (see process described in FIG. 4). In either case, the communication nodes 201 will know where to send their respective communication streams. In both master/slave and peer-to-peer the mixing node will start mixing 618 the streams in the mixing node's mixer 207 and send out the composite streams to the communication nodes 201 in the combined peer-to-peer communication session.

In a second embodiment, one of the existing mixing nodes (the mixing nodes of the two joined peer-to-peer communication sessions) becomes the mixing node for the combined peer-to-peer communication session. If the exchanged mixing scores 106 from step 602 indicate that one of the existing mixing nodes has the highest mixing score 106 and is capable of handling mixing for the communication devices 201 in the combined peer-to-peer communication session, in a master/slave system, the master node tells 610 the other mixing node(s) from the other peer-to-peer communication session to stop mixing. The master node tells 610 the communication nodes 201 using the dropped mixing node(s) to stream their communication stream to the other mixing node of the other peer-to-peer communication session. In both the master/slave and the peer-to-peer systems the mixing node's mixer 207 starts 612 mixing the additional streams and sends out the composite streams to the communication nodes 201 in the combined peer-to-peer communication session.

In a third embodiment, the joined peer-to-peer communication sessions keep the current mixing nodes. If the exchanged mixing scores 106 from step 602 indicate that the existing mixing nodes have the highest mixing scores 106 and one or both of the existing mixing nodes cannot handle the total number of streams to be mixed, the master node in a master/slave system will notify 606 the mixing nodes to stream to each other. In the peer-to-peer system, the mixing nodes will determine it on their own based on the exchanged mixing scores 106 from step 602. The mixing nodes mix 608 the communication streams from the other mixing node along with the communication streams from the respective communication nodes 201 and send out the composite streams to the communication nodes in the combined peer-to-peer communication session.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   a. getting a request to add one or more communication nodes to an existing peer-to-peer communication session between two communication nodes;
   b. adding the one or more communication nodes into the existing peer-to-peer communication session, wherein the communication nodes in the peer-to-peer communication session have not previously defined a mixing node;
   c. exchanging a mixing score of the communication nodes in the peer-to-peer communication session; and
   d. determining, based on the mixing score of the communication nodes in the peer-to-peer communication session the mixing node, wherein the mixing node is one of the communication nodes in the peer-to-peer communication session.

2. The method of claim 1, further comprising the steps of mixing a communication stream of the communication nodes in the mixing node into a composite stream and sending the composite stream to the communication nodes in the peer-to-peer communication session.

3. The method of claim 1, wherein exchanging further comprises a peer-to-peer exchange of the mixing scores between the communication nodes in the peer-to-peer communication session.

4. The method of claim 3, further comprising receiving a request to add an additional communication node to the peer-to-peer communication session and repeating steps (1*b*)-(1*d*) for the additional communication node.

5. The method of claim 1, wherein exchanging further comprises a master/slave exchange of the mixing scores between the communication nodes in the peer-to-peer communication session and a master node, wherein the master node is one of the communication nodes in the peer-to-peer communication session and further comprising the step of the master node notifying the communication nodes in the peer-to-peer communication session of the mixing node.

6. The method of claim 5, further comprising receiving a request to add an additional communication node to the peer-to-peer communication session and repeating steps (1*b*)-(1*d*) for the additional communication node.

7. The method of claim 5, further comprising the step of determining the master node based on at least one of the following: an arbitration process, exchanging the mixing score, a first communication node to initiate the peer-to-peer communication session, a comparison of current processing capabilities of the communication nodes in the peer-to-peer communication session, designating the mixing node as the master node, and a raw processing capability of the communication nodes in the peer-to-peer communication session.

8. The method of claim 1, wherein the mixing score of an individual one of the communication nodes in the peer-to-peer communication session comprises at least one of the following: a number of streams that can be mixed by the individual communication node, if mixing is allowed by the individual communication node, can the individual communication node be mobile, if the individual communication node can be mobile is it docked, a current processing capability of the individual communication node, a raw processing capability of the individual communication node, an ability of the individual communication node to channel all of its resources to the communication session, is the individual communication node a device dedicated to communication, a location of the individual communication node, a network proximity of the individual communication node to other communication nodes in the communication session, and a Quality of Service (QoS) of a network used by the individual communication node.

9. The method of claim 1, wherein determining comprises comparing the mixing score of the communication nodes in the peer-to-peer communication session.

10. The method of claim 1, further comprising:
receiving a request to remove at least one of the communication nodes in the peer-to-peer communication session;
removing the at least one of the communication nodes that requested to be removed; and
repeating steps (1c)-(1d) for the removed at least one communication node.

11. The method of claim 1, wherein the method of claim 1 is repeated for two individual peer-to-peer communication sessions, each with at least one or more individual mixing nodes and further comprising the step of receiving a request to join the two individual peer-to-peer communication sessions into a combined peer-to-peer communication session.

12. The method of claim 11, wherein the method of steps (1c)-(1d) are repeated based on the request to join the individual peer-to-peer communication sessions, the two peer-to-peer communication sessions are joined into the combined peer-to-peer communication session and one of the following events occur:
 i. one of the individual mixing nodes in one of the two peer-to-peer communication sessions becomes the mixing node for the combined peer-to-peer communication session;
 ii. the at least one of the individual mixing nodes for each of the individual peer-to-peer communication sessions continue to mix; and
 iii. a new mixing node is designated for the combined peer-to-peer communication session.

13. A system comprising:
 a. a network interface configured to get a request to add one or more communication nodes to an existing peer-to-peer communication session between two communication nodes and exchange a mixing score of the communication nodes in the peer-to-peer communication session; and
 b. a communications processor configured to add the one or more communication nodes into the existing peer-to-peer communication session, wherein the communication nodes in the peer-to-peer communication session have not previously defined a mixing node and determine, based on the mixing score of the communication nodes in the peer-to-peer communication session the mixing node, wherein the mixing node is one of the communication nodes in the peer-to-peer communication session.

14. The system of claim 13, further comprising a mixer configured to mix a communication stream of the communication nodes into a composite stream and the network interface is further configured to send the composite stream to the communication nodes in peer-to-peer communication session.

15. The system of claim 13, wherein the network interface is further configured to exchange, using a peer-to-peer exchange the mixing score between the communication nodes in the peer-to-peer communication session.

16. The system of claim 15, wherein the network interface is further configured to receive a request to add an additional communication node to the peer-to-peer communication session.

17. The system of claim 13, wherein the network interface is further configured to exchange, using a master/slave exchange the mixing score between the communication nodes in the peer-to-peer communication session and a master node, wherein the master node is one of the communication nodes in the peer-to-peer communication session and further comprising the step of the master node notifying the communication nodes in the peer-to-peer communication session of the mixing node.

18. The system of claim 17, wherein the network interface is configured to receive a request to add an additional communication node to the peer-to-peer communication session.

19. The system of claim 17, wherein the communication processor is further configured to determine the master node based on at least one of the following: an arbitration process, exchanging the mixing score, a first communication node to initiate the peer-to-peer communication session, a comparison of current processing capabilities of the communication nodes in the peer-to-peer communication session, designating the mixing node as the master node, and a raw processing capability of the communication nodes in the peer-to-peer communication session.

20. The system of claim 13, wherein the mixing score of an individual one of the communication nodes in the peer-to-peer communication session comprises at least one of the following: a number of streams that can be mixed by the individual communication node, if mixing is allowed by the individual communication node, can the individual communication node be mobile, if the individual communication node can be mobile is it docked, a current processing capability of the individual communication node, a raw processing capability of the individual communication node, an ability of the individual communication node to channel all of its resources to the communication session, is the individual communication node a device dedicated to communication, a location of the individual communication node, a network proximity of the individual communication node to other communication nodes in the communication session, and a Quality of Service (QoS) of a network used by the individual communication node.

21. The system of claim 13, wherein the communication processor is further configured to comparing the mixing score of the communication nodes in the peer-to-peer communication session.

22. The system of claim 13, wherein the network interface is further configured to receive a request to remove at least one of the communication nodes in the peer-to-peer communication session and the communication processor is further configured to remove the at least one of the communication nodes that requested to be removed.

23. The system of claim 13, wherein the network interface is further configured to receive a request to join two individual peer-to-peer communication sessions, each with one or more individual mixing nodes into a combined peer-to-peer communication session.

24. The system of claim 23, wherein the communication processor is further configured to join the two peer-to-peer communication sessions into the combined peer-to-peer communication session and one of the following events occur:

i. one of the individual mixing nodes in one of the two peer-to-peer communication sessions becomes the mixing node for the combined peer-to-peer communication session;
ii. the at least one of the individual mixing nodes for each of the individual peer-to-peer communication sessions continue to mix; and
iii. a new mixing node is designated for the combined peer-to-peer communication session.

* * * * *